UNITED STATES PATENT OFFICE.

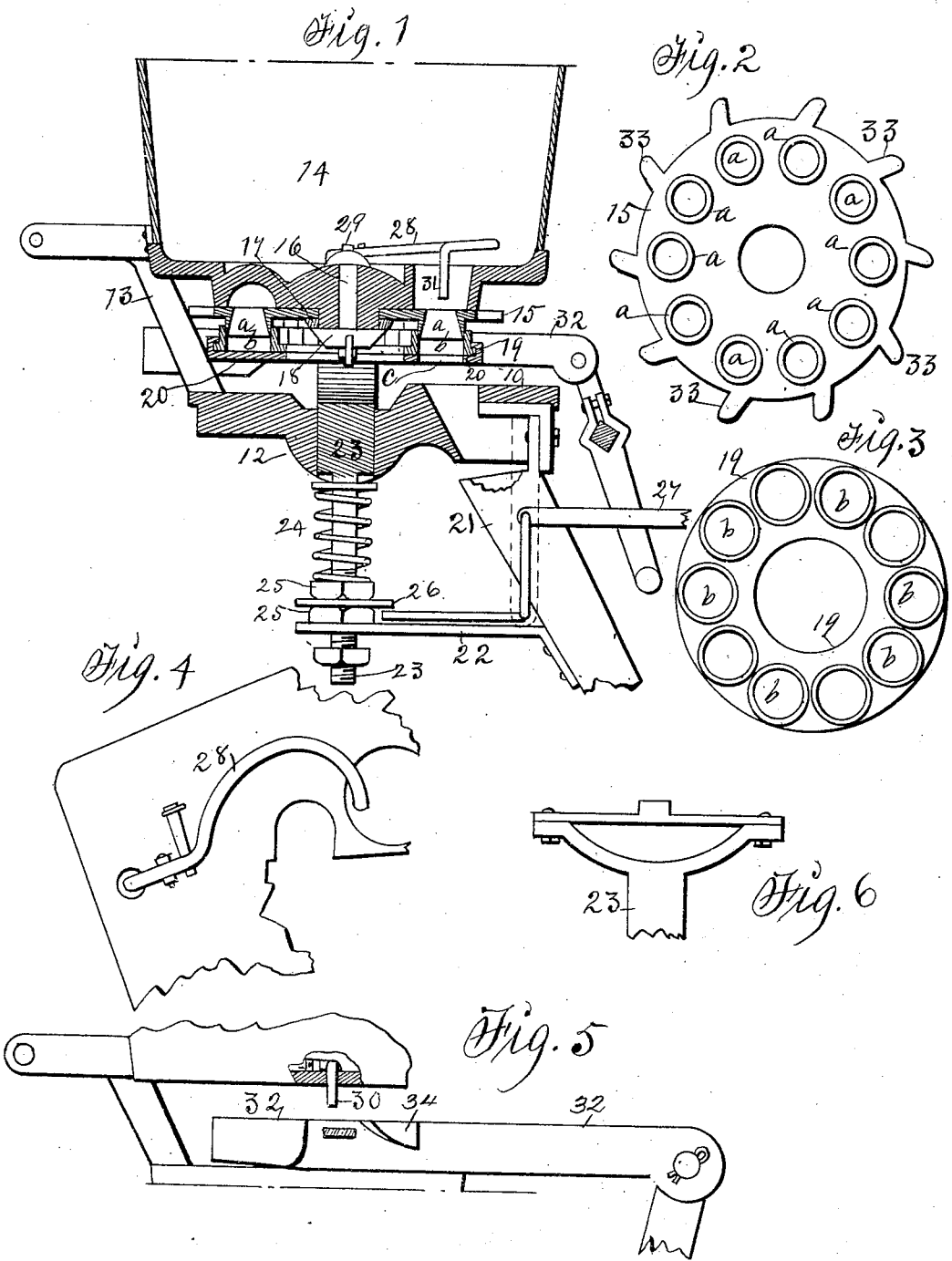

MARTIN MEYER, OF SHEFFIELD, IOWA.

CORN-PLANTER.

No. 832,022. Specification of Letters Patent. Patented Sept. 25, 1906.

Application filed February 16, 1906. Serial No. 301,941.

*To all whom it may concern:*

Be it known that I, MARTIN MEYER, a citizen of the United States, residing at Sheffield, in the county of Franklin and State of Iowa, have invented a new and useful Corn-Planter, of which the following is a specification.

My object is, first, to regulate the quantity or numbers of seeds dropped at a time in different kinds of ground in different fields or in the same field and in the same line of advance across a field; second, to prevent corn from clogging in the seed-cups and preventing the dropping of corn at each and every intermittent rotary motion of the rotary disk that has a plurality of seed-cups.

My invention consists in the construction, arrangement, and combination of operative elements with a seed-box, as hereinafter set forth, pointed out in my claims, and illustrated in the accompanying drawings, in which—

Figure 1 is a sectional view of a seed-box and my seed regulating and dropping mechanism combined therewith. Fig. 2 is a bottom view of the rotatable seed-carrying disk that has a plurality of seed-cups. Fig. 3 is a top view of an auxiliary rotatable disk that has an equal number of seed-cups projecting upward and adapted to be telescopically connected with the seed-cups in the disk above it, as required, to lengthen and shorten the cups at the pleasure of the operator. Fig. 4 is an enlarged top view of a portion of the bottom of a seed-box and shows the device for automatically pressing corn out of the seed-cups when they are in coinciding position with a port in the fixed disk under the rotatable disks. Fig. 5 is an enlarged view, partly in section, of the reciprocating bar that imparts intermittent rotary motion to the rotatable disks and also actuates the device for pressing corn out of the seed-cups when they coincide with the port in the fixed plate under the rotatable disks; and Fig. 6 shows the top portion of the vertically-adjustable auxiliary disk-support.

The numeral 10 designates the bench formed of cross-bars that connects the runners of a corn-planter frame and supports the seed-boxes, and 12 is a frame that has a vertical extension 13, to which a seed-box 14 is fixed in any suitable way. To the bottom of the seed-box is connected a rotatable disk 15, that has a plurality of seed-cups *a* that project downward, by means of a bolt 16, washer 17, and nut 18. A second rotatable disk 19, having seed-cups *b*, projecting upward and telescopically connected with the cups *a*, projecting downward from the disk 15, is supported upon a plate 20, with which it is connected, as shown in Fig. 1, or in any suitable way that will retain the rotatable disks 15 and 19 in concentric position and allow them to rotate jointly.

A seed-conveyer 21 is fixed to the bench 10 and a bracket 22, fixed thereto for supporting an upright 23, fitted in a bearing in the frame 12. A spring 24 is placed on the upright 23 to normally retain the disk 20 elevated at any desired position for regulating the depth of the seed-cups *a b*, and the tension of the spring can be regulated by nuts 25 on the screw at the lower end of the upright 23. A disk 26 is fixed on the upright between the nuts 25, and the end of a crank 26 extends under the disk 26 in such a manner that when the crank is actuated by a lever 27, connected with the other end by means of a treadle or stirrup, it will elevate the upright 23 as required to press the plate 19 upward to reduce the depth of the seed-cups *a b*.

A bent seed-ejector 28 is pivoted to a bearer 29 on top of the bottom of the seed-box, as shown in Figs. 4 and 5, and one of its ends 30 extends through an aperture in the bottom of the seed-box and the other end, and 31 projects down through an opening, as shown in Fig. 1, to enter the seed-cup *a b* whenever the end 30 is elevated. To automatically elevate that end whenever seeds are dropped, the pusher-bar 32, that imparts intermittent motion to the disk 15 by engaging one of its spurs 33, a cam 34 is fixed on the side of the bar 32, as shown in Fig. 5, in such a manner that the cam will engage one of the spurs 33 and lift the bar to engage the end 30, as required, to actuate the lever 28 to press its end 31 down into the cups *a b* to prevent seed from clogging in the cups and to assure the passing of seed from the cups as they successively come into coinciding position with the port *c* in the plate 20.

Having thus set forth the purposes of my invention and the construction, arrangement, and combination of the different parts, the practical operation and utility thereof will be readily understood by persons familiar with the art to which it pertains.

What I claim as new, and desire to secure by Letters Patent, is—

1. In a corn-planter, a rotatable disk having a plurality of seed-cups extended downward and a second rotatable disk having a plurality of seed-cups extending upward and telescopically connected with the cups in the upper disk.

2. In a corn-planter, a rotatable disk having a plurality of seed-cups extended downward and a second rotatable disk having a plurality of seed-cups extending upward and telescopically connected with the cups in the upper disk and means for adjusting the lower disk as required for lengthening and shortening the seed-cups to increase or diminish their capacity for measuring seed.

3. In a corn-planter, a rotatable disk having a plurality of seed-cups extended downward and a second rotatable disk having a plurality of seed-cups extending upward and telescopically connected with the cups in the upper disk, a plate connected with the lower disk and a vertically-adjustable upright under the plate for adjusting the lower disk as required for lengthening and shortening the seed-cups to increase or diminish their capacity for measuring seed.

4. In a corn-planter, a rotatable disk having a plurality of seed-cups extended downward and a second rotatable disk having a plurality of seed-cups extending upward and telescopically connected with the cups in the upper disk, a plate connected with the lower disk and a vertically-adjustable upright under the plate for adjusting the lower disk as required for lengthening and shortening the seed-cups to increase or diminish their capacity for measuring seed and means for adjusting the upright by foot-pressure when the planter is advancing.

5. A seed-ejector pivotally connected with the bottom of a seed-box and one of its ends projected down through an aperture and its other end through a seed-port, in combination with a rotatable disk having a plurality of seed-cups, a reciprocating bar for imparting intermittent rotary motion to a rotatable disk having a plurality of seed-cups, a cam on said bar for elevating the bar to actuate the lever for pressing seeds down through seed-cups.

MARTIN MEYER.

Witnesses:
L. F. GROSS,
G. A. JOHNSTON.